United States Patent [19]

Lindsley

[11] 4,125,591

[45] Nov. 14, 1978

[54] PROCESS FOR PRODUCING RARE EARTH EXCHANGED CRYSTALLINE ALUMINOSILICATE

[75] Inventor: John F. Lindsley, Stamford, Conn.

[73] Assignee: American Cyanamid Company, Stamford, Conn.

[21] Appl. No.: 424,386

[22] Filed: Dec. 13, 1973

Related U.S. Application Data

[63] Continuation-in-part of Ser. No. 234,984, Mar. 15, 1972, abandoned, which is a continuation-in-part of Ser. No. 837,501, Jun. 30, 1969, abandoned, which is a continuation-in-part of Ser. No. 506,857, Nov. 8, 1965, abandoned, and Ser. No. 506,859, Nov. 8, 1965, abandoned.

[51] Int. Cl.² .......................................... C01B 33/28
[52] U.S. Cl. ................................. 423/328; 252/455 Z
[58] Field of Search ............... 423/328, 329, 330, 118; 252/455 Z

[56] References Cited

U.S. PATENT DOCUMENTS

| | | | |
|---|---|---|---|
| 3,140,253 | 7/1964 | Plank et al. | 252/455 Z X |
| 3,271,418 | 9/1966 | Plank et al. | 252/455 Z X |
| 3,293,192 | 12/1966 | Maher et al. | 423/328 |
| 3,402,996 | 9/1968 | Maher et al. | 423/328 |

*Primary Examiner*—Edward J. Meros
*Attorney, Agent, or Firm*—William J. van Loo

[57] ABSTRACT

A process for preparing rare earth exchanged zeolite X and zeolite Y having improved activity and stability. The process of this invention involves partially exchanging sodium forms of zeolite X and zeolite Y with a solution of rare earth ions; calcining the partially exchanged zeolites; and further exchanging the calcined partially exchanged zeolites to replace remaining alkali metal ions.

2 Claims, 2 Drawing Figures

PROCESS FOR PRODUCING RARE EARTH EXCHANGED CRYSTALLINE ALUMINOSILICATE

RELATED APPLICATIONS

This application is a continuation-in-part of application Ser. No. 234,984 filed Mar. 15, 1972 now abandoned, which in turn is a continuation-in-part of application Ser. No. 837,501 filed June 30, 1969, now abandoned, which in turn is a continuation-in-part of application Ser. No. 506,857 filed Nov. 8, 1965, now abandoned, and application Ser. No. 506,859 filed Nov. 8, 1965, now abandoned.

FIELD OF INVENTION

This invention relates to a process of providing rare earth exchanged synthetic crystalline aluminosilicates of improved properties. It relates further to the provision of cracking catalysts containing said aluminosilicates.

The purpose of this invention is to provide an efficient ion exchange process for replacing alkali metal ions with rare earth metal ions in synthetic crystalline aluminosilicates, specifically the two aluminosilicates known as zeolite X and zeolite Y.

This process yields rare earth exchanged crystalline aluminosilicates with much less difficulty than is involved in prior art processes.

An additional advantage of this process is that the spatial relationship of the atoms and the size of the crystal lattice of the starting material remain essentially unchanged.

Another advantage is that partial rare earth exchange can be effected with the crystalline aluminosilicate deposited on a supporting matrix.

Yet another advantage of the invention is the provision for catalyst materials having improved activity and stability in use relative to comparable prior art materials.

BACKGROUND OF INVENTION

Naturally occurring hydrated metal aluminum silicates are called zeolites. The synthetic counterparts of these materials with which this invention is concerned have a composition which is similar to some of the natural zeolites and accordingly the term "zeolite" has been applied to these synthetic materials. Zeolites can be synthesized with significant differences in crystal lattice and to distinguish the various synthetic zeolites from each other, specific zeolites are identified by a number and/or a letter designation following the term "zeolite." The two zeolites with which the present invention is specifically concerned are zeolite X and zeolite Y.

Zeolites selectively adsorb molecules on the basis of the size and shape of the adsorbate molecule and thus, they are called molecular sieves. Molecular sieves have a sorption area available on the inside of a large number of uniformly sized cages of molecular dimensions. With such an arrangement, molecules of a certain size and shape enter the cages and are adsorbed while larger or differently shaped molecules are excluded.

Zeolite X and zeolite Y are basically three-dimensional frameworks of $SiO_4$ and $AlO_4$ tetrahedrons cross-linked by the sharing of oxygen atoms. The electrovalence of each tetrahedron containing aluminum is balanced by the presence in the aluminosilicate framework of a cation, which in the case of synthetic zeolites is generally an alkali metal ion. Void spaces in the framework can be generated by evaporation of water molecules from the material as formed.

As pointed out in the prior art, for example U.S. Pat. No. 3,140,249 and U.S. Pat. No. 3,140,251, synthetic aluminosilicates of the type contemplated for use in this invention have been employed in hydrocarbon conversion processes. Molecular sieves containing alkali metal ions and having water molecules in the crystalline framework are not suitable, as such, for these uses. The water molecules reduce the adsorption capabilities of the crystals. Dehydration effects the loss of water of hydration and results in a crystal interlaced with channels of molecular dimensions that offer very high surface areas for the adsorption of foreign molecules.

Alkali metal ions generally result in catalysts of poor activity and thermal and/or hydrothermal stability. It is known that the alkali metal content of synthetic zeolites can be reduced by an ion exchange process wherein the alkali metal ions are replaced by various other metal ions which do not adversely effect catalyst life. Frequently rare earth metals are used to replace the alkali metal ions since the resultant rare earth exchanged zeolites are highly active for a wide variety of chemical reactions and at the same time possess the desired degree of longevity not found in the zeolites having a high alkali metal content.

The rare earth metal salts which are employed for this purpose may be either single rare earth salts of mixtures of salts such as rare earth chlorides or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and ytterbium. Rare earth metal chloride solutions are commercially available and generally contain the chlorides of a rare earth metal mixture in the following proportions, measured in terms of the oxides on a weight basis: cerium (as $CeO_2$), 48%; lanthanum (as $La_2O_3$), 24%; praseodymium (as $Pr_6O_{11}$), 5%; neodymium (as $Nd_2O_3$), 17%; samarium (as $Sm_2O_3$), 3%; gadolinium (as $Gd_2O_3$), 2%; ytterbium (as $Y_2O_3$), 0.2%; and other rare earth oxides equal to 0.8%. Didymium chloride is also a mixture of rare earth chlorides, but one which has a low cerium content. It consists of the following rare earths determined as oxides and expressed on a weight basis: lanthanum, 45–46%; cerium, 1–2%; praseodymium, 9–10%; neodymium, 32–33%; samarium, 5–6%; gadolinium, 3–4%; ytterbium, 0.4%; and other rare earths 1–2%. Other mixtures of rare earths are equally applicable in effecting the exchange process for the reduction of the alkali metal content of the zeolitic material.

The two zeolites with which this invention is concerned have found widespread acceptance as catalysts in the petroleum conversion field. Both zeolites can be represented by a chemical formula, expressed in terms of moles of oxides. This formula is as follows:

$$0.9 \pm 0.2\ Na_2O: Al_2O_3: wSiO_2: xH_2O$$

wherein the value of w is between 3 and 6 in the case of zeolite Y, and between 2 and 3 in the case of zeolite X, and x may have a value up to about 9.

In producing the two zeolitic materials an aqueous reaction mixture containing oxides or materials whose chemical compositions can be represented as mixtures of oxides (i.e. $Na_2O$, $Al_2O_3$, $SiO_2$, and $H_2O$) is reacted suitably at a temperature of about 100° C. for periods of time ranging up to 90 hours or longer. The product which crystallizes from the reaction mixture is filtered off, washed with distilled water until the effluent wash water in equilibrium with the zeolite has a pH of from about 9 to 12. The material after activation through drying is ready for use as a molecular sieve. By virtue of the fact that the conveniently available sources of oxides generally contain sodium, zeolite X and zeolite Y as produced, always have sodium cations which must be replaced with other cations for the reasons which have been outlined hereinabove. The replacement is generally accomplished by an exchange process whereby other cations are substituted in the crystal lattice for the sodium ions. The substitute cations should be ones which do not alter the crystalline framework. The combination of cations and specific framework is responsible for the great catalytic activity and selectivity of molecular sieves, and which impart a catalytic activity not found in the sodium forms of zeolite X and zeolite Y.

Several approaches have been employed for the production of exchanged zeolites. One of the early approaches is disclosed in U.S. Pat. No. 2,882,244. Therein it was suggested that the zeolite material be exchanged by treatment with an acid or a salt of another material having a cation which is capable of imparting desired physical properties to zeolites. Among the acids named were hydrochloric acid, which results in the replacement of the sodium ions with hydrogen ions. Other reagents disclosed in the patent were salts of any of many metals and ammonium salts. Among the metals suggested were the alkaline earth metals, nickel, zinc, silver and strontium. Measurements of the several ion exchanged forms showed that the replacement of sodium ions in the original sodium form of the zeolite was accompanied by a change in the size of the pores in the crystalline structure. This change effected the selectivity of the zeolitic materials. The magnitude of the effect varied with the nature of the cation.

Another method for removing the sodium cations from zeolites is based upon the concept of "decationization." In this approach, the metallic cations of the zeolitic molecular sieve are replaced with hydrogen or ammonium cations and the resultant exchanged material is heated to a temperature between about 350° C. and about 600° C. The decationization process is accompanied by the evolution of water. The water is believed to be constituted of hydrogen from the cation sites and an equivalent amount of oxygen released from the aluminosilicate framework. When a zeolitic material having a silica to alumina ratio less than 3 is subjected to the decationization process, the crystal framework is not capable of withstanding the removal of the cation and consequently collapses. Decationization is thus useful only for zeolites having a silica to alumina ratio of greater than 3. The decationized product provides an improved version of the sodium zeolites but is not fully satisfactory in comparison with certain forms of zeolites. Moreover, decationization results in a change in the crystalline structure of the zeolite. Though the change is normally slight, any deviation in structure from the original starting material is not desirable in view of the importance of the crystalline structure to the selectivity of the molecular sieve.

One attempt at getting the benefits of decationization without the adverse effect thereof is reported in U.S. Pat. No. 3,293,192 (Maher et al). In accordance with this patent, the composition of the zeolite which is subjected to decationization has a great impact upon the success of the process. The patentee starts with zeolite 14 HS sodium, which is said to be capable of withstanding the rigors of decationization in a uniquely successful manner. The Maher et al. process involves treating zeolite 14 HS sodium with an ammonium salt, amine salt or other salt which on calcination decomposes to leave appreciable portions of the zeolite in the hydrogen form. While the resultant exchanged zeolite is said to be ultrastable, the material does have a unit cell size which is smaller than the size of the unexchanged zeolite starting material. Moreover, the ionic nature and consequently the polar adsorption sites are modified during the exchange process.

Still another approach at removing sodium ions from zeolites to thereby overcome one of the principal causes of the lack of structural stability at high temperatures was reported in U.S. Pat. No. 3,140,252 (Frilette), and U.S. Pat. No. 3,140,253 (Plank). These patents are based upon the discovery that zeolites which are exchanged with aqueous solutions of rare earth salts possess the ultimate degree of structural stability and catalytic activity and selectivity desired for molecular sieves since the rare earth cations tend to impart stability to the aluminosilicate compositions to a far greater degree than do other cations, nevertheless the rare earth exchanged zeolites and highly active for a wide variety of chemical processes and thus these materials are more widely used than any other zeolites in the petroleum conversion industry.

There are several important considerations in choosing the exchange process by which sodium ions will be removed from the crystalline structure of aluminosilicates. It is important that the exchange process not affect the spatial arrangement of the atoms in the crystalline lattic, since the arrangement of the atoms contributes in large part to the desired activity of the catalyst. It is also important that the exchange process have only minimal effect upon the dimensions of the cages in the crystalline lattice, since these dimensions are critical to the retention of selectivity, one of the most important characteristics of molecular sieves. Likewise, the cation which is used to replace sodium in the aluminosilicate crystalline structure must impart good structural properties to the crystals and at the same time not adversely affect the catalytic activity thereof. The choice of exchange process and the cation used therein will also depend upon the particular zeolite which is to be treated, since the behavior of the zeolite to the exchange process is in large part dependent upon the particular composition of the zeolitic material.

In connection with the effect of the zeolite composition upon the behavior of the zeolite to the exchange medium, it is noted that zeolite X and zeolite Y lose their sodium cations at entirely different rates which are inherently determined by the nature of the respective materials. Zeolite X can be substantially fully exchanged with rare earth ions by subjecting the zeolitic material to a sufficient number of exchanges. The rate of replacement of the sodium ions decreases as the sodium oxide content of the zeolite X becomes lower but the rate remains sufficiently high for substantially complete removal of sodium ions to be effective after a sufficiently large number of exchanges and for long time periods. In the case of zeolite Y, it has not been possible to exchange all the sodium from the sodium form with rare earth cations, even with repeated exchange steps.

In view of the desirable characteristics of rare earth exchanged zeolite X and zeolite Y and the difficulty encountered in effecting the replacement of sodium ions with rare earth ions, it is an object of the present invention to provide a method for efficiently and economically replacing the sodium content of sodium zeolites with rare earth ions. It is a further object of the present invention to provide cracking catalysts of improved catalytic activity and structural stability when rare earth exchanged. It is a further object of the present invention to provide a process for exchanging sodium ions for rare earth ions while leaving the spatial relationship of the atoms and the size of the crystal lattice essentially unchanged. It is a still further object of this invention to provide an exchange process which is useful for exchanging crystalline aluminosilicates deposited on a supporting matrix which has catalytic activity whereby the resulting catalyst is prepared conveniently and economically without any sacrifice of usefulness.

SUMMARY OF THE INVENTION

According to the present invention, a process is provided for reducing the alkali metal content of sodium zeolites by a combination of steps comprising (1) partially reducing the alkali metal content by base exchange with a solution consisting essentially of rare earth metal salts; (2) calcining the partially base exchanged zeolite at a temperature above about 450° Centigrade; (3) thereafter subjecting the calcined partially exchanged crystalline aluminosilicate to further base exchange with an aqueous solution of rare earth metal and/or ammonium salts to reduce the alkali metal content still further.

The process of the present invention may be carried out on either sodium zeolite X or sodium zeolite Y. The alkali metal content of the zeolite may be reduced to the extent required by treating the molecular sieve prior to incorporation into, or admixture with, a matrix and then reduced further to the desired degree after the zeolite and matrix have been blended.

In any event, the three critical steps in the process of this invention must be adhered to. These steps are: initial exchange with an aqueous solution consisting essentially of rare earth ions to partially remove the sodium content of the sodium zeolite, calcination of the partially exchanged material and further exchange with an aqueous solution containing rare earth and/or ammonium cations.

In carrying out the exchange treatment prior to calcination, the procedure which is employed comprises contacting the zeolite with an aqueous solution consisting essentially of rare earth cations as initially employed. The aqueous solution used in the precalcination exchange treatment should initially be substantially free of other cations, i.e., it should have no more than about one percent by weight of any other cation. The exchange treatment is generally effected at elevated temperatures although exchange does occur at a slower rate under ambient temperatures. Normally, exchanging at a temperature in the range of 40° C. to 60° C. leads to replacement of the sodium ions of the sodium zeolite at a reasonably rapid rate. Use of higher temperatures leads to the problem of the evaporation of the water and the often unwanted and unpredictable change in concentration of the rare earth ions in solution. Exchanging at lower temperatures would require cooling and there is no advantage to justify this added cost. Temperatures in the preferred range avoid these difficulties.

The concentration of rare earth cations in the aqueous solution used for the precalcination exchange may vary widely but will have an effect upon the number of exchanges which will be required to obtain the level of alkali metal cations in the sodium zeolite. The rate at which the sodium ions are exchanged for rare earth ions depends on the concentration of rare earth ions and the concentration of alkali metal ions generated in the exchange solution. As exchange proceeds, the concentration of rare earth ions decrease, whereas the concentration of the sodium ions increases in the exchange solution. Consequently the rate of exchange continues to decrease during each exchange treatment.

As noted above, it becomes progressively more difficult to replace the sodium ions of sodium zeolites as the level of sodium in the zeolitic structure becomes lower. The exchange rates are determined by the composition of the specific zeolite which is being exchanged. Zeolite X, which contains about 20% sodium oxide prior to exchange treatment, is rapidly exchanged with rare earth ions up to the point where the sodium oxide content descends to about 1.0 to 1.5 weight percent. After this point, the sodium ions are difficult to remove from the crystal lattice even after extended and continuous exchange with fresh rare earth solutions.

In the case of sodium zeolite Y, exchange with rare earth cations occurs at a relatively rapid rate until the point where the sodium oxide content of the sodium zeolite is in the range of 3 to 4 percent based upon the dry weight of the zeolite Continuation of the exchange treatment after this point even with the use of fresh rare earth solutions in which the concentration of rare earth ions is high and of generated sodium ions is low, is ineffective for the purpose of lowering the alkali metal content of the zeolite.

Thus in the case of zeolite X the precalcination exchange treatment can be conveniently and effectively continued until the sodium content is in the range of 1.0 to 1.5 percent based upon the dry weight of the zeolite. In the case of the zeolite Y, the exchange, prior to calcination can be conveniently continued until the point where the sodium oxide content is about 3 percent. The partial exchange can be terminated prior to this point but it is not preferably to do so since greatest advantage should be taken of this rapid exchange rate and the greater thermal stability occasioned by the low sodium content. It is preferred in accordance with this invention to conduct the exchange prior to calcination until the sodium oxide content is about 3 to 4 percent of the dry weight of the zeolite.

Subsequent to the exchange step leading to the preparation of the partially exchanged zeolite X and zeolite Y, the partially exchanged zeolites are calcined, for example at a temperature in the range of 450° to 900° C. with or without an atmosphere of steam. The thermal treatment is continued until substantially all the water of hydration present in the crystalline lattice is removed. Calcination for a period of about 0.1 hour or more is usually effective to remove the desired amount of water from the partially exchanged zeolite.

While it is not intended to limit the present invention to any theoretical consideration, it is believed that calcination of the rare earth exchanged sodium zeolite causes water which is associated with the rare earth ions in the partially exchanged material to be driven off, leaving dehydrated rare earth ions which are small enough to pass through the pore openings in the sodalite cages for exchange with alkali metal ions remaining therein. As the dehydrated rare earth metal ions exchange for the alkali metal ions within the sodalite cages, the alkali metal ions occupy the positions outside the sodalite cages formerly occupied by the rare earth metal ions where they are more readily exchanged in a subsequent exchange. In the subsequent exchange carried out with water, the rare earth metals within the sodalite cages again become hydrated but are too large to pass out of the cage openings. Consequently, the subsequent exchange removes additional sodium ions from external positions without effect on the rare earth metal cation content within the sodalite cages. Thus the calcination as practiced in the present invention serves a dual role. In one role, the calcination dehydrates the rare earth metal cation sufficiently so as to enable it to pass through the cage openings and exchange alkali metal ions in the sodalite cage of the zeolites. In its second role, the calcination effects dehydration of the partially exchanged sodium zeolite material.

The fact that the rare earth metal cations penetrate the cage openings of the unit cells of the zeolites as a consequence of the calcination step and that subsequent exchange does not remove these cations but replaces external alkali metal ions displaced from inside the pore openings is supported by various physical property data given in the examples below. The increased activity and stability of catalysts of the present invention represent distinctions over prior art catalysts. Such distinctions can readily be accounted for in view of the increased content and more favorable distribution of rare earth metal cations achieved by the present invention. Analyses of the catalyst materials confirm the higher rare earth metal content of catalysts of the present invention. X-ray diffraction patterns of the catalysts of the present invention confirm distribution of rare earth metals throughout the catalyst structure and establish differences from X-ray diffraction patterns of the prior art catalysts. Performance data obtained under identical testing conditions establish the superior activity and stability of catalysts of the present invention. That is to say, the inherent nature of catalyst materials obtained according to the process of the present invention is such as to provide distinctions and advantages over prior art catalyst materials.

Thus, the crux of the present invention is not only in the specific sequence of a first exchange of alkali metal ions, followed by calcination and a second exchange of alkali metal ions, but also is in the particular use of essentially only rare earth metals in the first exchange. Thus, in the case where other ions such as silver ions are employed, such ions even in hydrated form are sufficiently small to penetrate the cage openings of the unit cells and calcination has no significant effect on the extent to which the zeolite can be further exchanged. When subjected to subsequent exchange, such ions, although rehydrated, can escape from the sodalite cages and any re-exchange employed will, due to equilibrium considerations, re-introduce alkali metal ions into the cage openings as well as exchange any external alkali metal ions present. Contrary to this, in the present invention, once the rare earth metal ions enter into the cage openings and become located within the unit cells, subsequent exchange, which leads to re-hydration of the rare earth metal cations, cannot remove these cations from the unit cells due to size limitations of the cage openings with the result that a more complete removal of alkali metal ions is achieved without loss of rare earth metal cations from the unit cells.

Calcination as practised in the present invention has in part the function of dehydrating the partially exchanged sodium zeolite material. The dehydrated materials are characterized by the same spatial relationship and pore size as the material prior to calcination. This is distinctively different from the case where the preliminary exchange prior to calcination is conducted with an amine or ammonium compound, since calcination of an ammonium exchange sodium zeolite results in the evolution of ammonia and a change in size of the openings of the crystal lattice of the zeolite. Subsequent exchange of such calcined zeolites with rare earth metal cations does not lead to the desirable distribution of these cations within the unit cells even upon subsequent calcination because of the reduction in cage dimensions and/or in available sites for exchange cations and/or in thermostability caused by the calcination after the first exchange.

After calcination, the material is subjected to further ion exchange with a solution containing ammonium and/or rare earth metal cations. The rare earth salts which can be used in the post-calcination exchange step are the same as those used in the pre-calcination exchange treatment. The amine or ammonium salts which can be used are ammonium chloride, nitrate and sulfate, trimethylammonium hydrochloride and other salts which produce ammonia on being heated. In the exchange which follows calcination, the criticality as to rare earth metal cations in the exchange medium is reduced or removed, since the rare earth metal cations previously introduced are not subject to removal from the catalyst.

As in the initial exchange, the subsequent exchange procedure involves the agitation of a slurry of the partially exchanged crystalline aluminosilicate in a solution of the salt containing the desired cation. After the desired period of time, the crystalline aluminosilicate is removed from the slurry by filtration or an equivalent procedure.

The process of the present invention is capable of reducing the alkali metal content of sodium zeolite to a level below that which can be obtained without calcination prior to complete exchange treatment. In the case of zeolite X, the method of the present invention can be used to reduce the sodium content to a level approximating zero in a much shorter order than would be the case without the calcination treatment. In the case of zeolite Y, calcination of the partially exchanged material permits the production of zeolite Y with a lower alkali metal content than could be otherwise achieved.

The rare earth exchanged zeolite Y of the present invention is distinguished from exchanged zeolite Y prepared by processes of the prior art in having a rare earth content of at least about 18.5%, on the dry weight of the zeolite. The rare earth exchanged zeolite Y of the present invention has a modified X-ray powder diffraction pattern of conventional zeolite Y. It is not distinguished from conventional zeolite Y by any difference in dimension or shape of the crystalline lattice or spatial relationship of the atoms of the lattice. Thus the material has the same desirable adsorption and refusal characteristics of zeolite Y. In addition, the rare earth exchanged zeolite Y of the present invention possesses an extremely high level of both thermal and steam stability.

As noted above, the zeolites produced by the present invention can be used in combination with other support materials, especially those which themselves have catalytic activity. The combination of the crystalline aluminosilicate prepared by the present invention and the support material should contain about 1 to 25 percent of the crystalline material. The incorporation of the exchanged zeolite X or exchanged zeolite Y produced by the present invention into the catalytically active matrix can be accomplished in several different ways. Thus, the composite of the exchanged zeolite and the inorganic oxides may be prepared by first forming the matrix material and intimately associating the exchanged aluminosilicates therewith by any convenient technique, including grinding, milling, blending or homogenization. The aluminosilicate may be incorporated into hydrogen-cogel composites or they may be incorporated by procedures wherein the alumina is precipitated onto silica and the resultant composite intimately associated with the crystalline aluminosilicate which has been exchanged in accordance with the present invention. In general, the combination of the exchanged material and the inorganic oxide matrix follows known procedures, many of which have been described in the patent literature, including U.S. Pat. Nos. 3,140,249 and 3,271,418.

Thus, typically, a rare earth exchanged zeolite X or zeolite Y sieve is blended in the desired weight ratio with washed silica-alumina cogel containing 13 percent alumina. The mixture may then be milled to produce a uniform blend and then spray dried.

An alternate procedure and one which constitutes another aspect of the present invention is to combine the rare earth exchanged crystalline aluminosilicate according to the process of the invention with either a silica-alumina matrix prior to washing the matrix to remove unwanted anions; or with sodium silicate prior to gelation with sulfuric acid or alum and coating with alumina. The combined exchanged zeolite and unwashed silica-alumina mixture is then washed to remove unwanted ions and simultaneously introduce the cations which are to be exchanged for the remaining sodium cations in the composite catalyst. Thus in one step, two functions are accomplished. The composition of the crystalline aluminosilicate is both exchanged to remove sodium ions and washed to remove sulfate ions introduced into the oxide mixture during its formation. The use of the aluminosilicate with its locked-in content of rare earth cations avoids loss or replacement of desired cation content upon subsequent exchanges of the composite. After this combined washing-exchange treatment, the composite material is then thoroughly milled or homogenized to produce a uniform blend which can then be converted to the form in which it is to be used during the catalytic conversion of petroleum fractions. Thus the mixture can be converted to pellets by known extrusion procedures or into finely divided particles by conventional spray drying techniques.

THE DRAWINGS

The present invention may be more fully understood by reference to the accompanying drawings.

Figure 1:
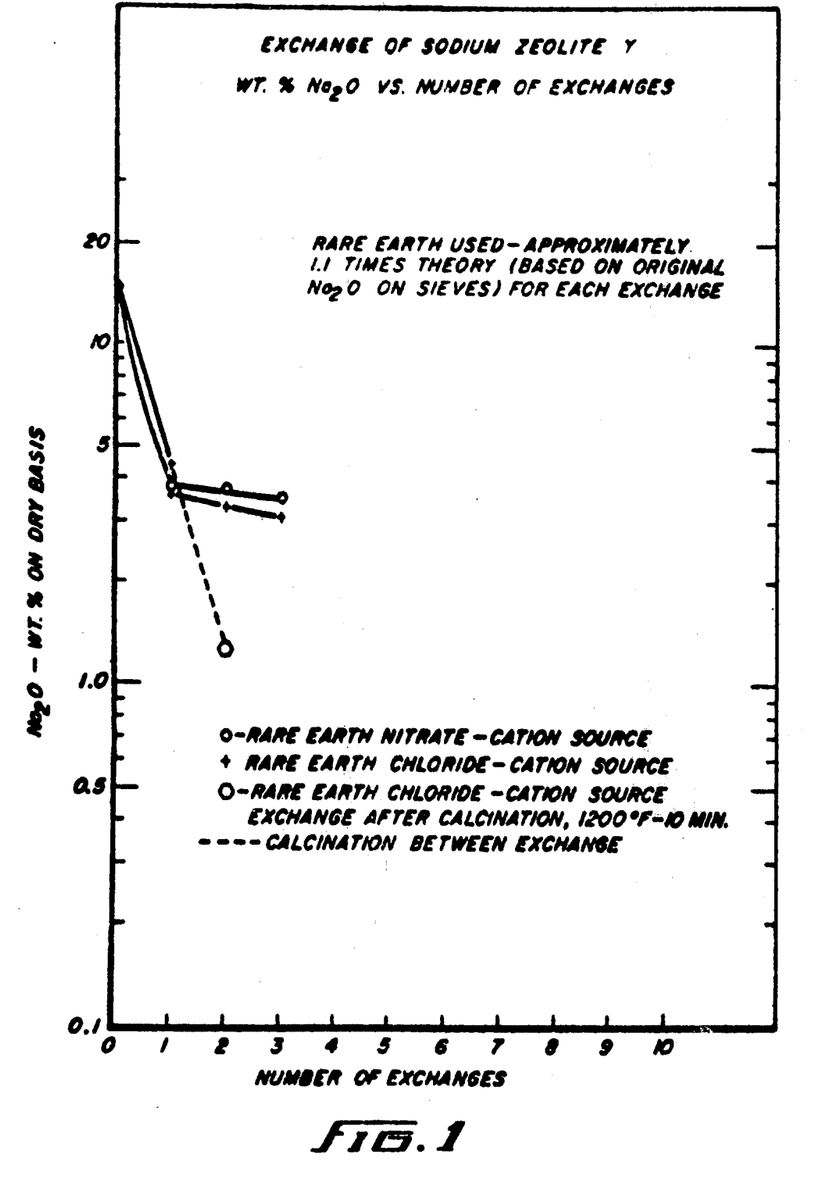
FIG. 1 is a graph showing the relationship between the sodium oxide content of zeolite Y and the number of exchanges using an aqueous solution containing 1.1 equivalents of rare earth metal ions in each exchange.

It will be seen in the case of zeolite Y that the original material contained approximately 14 to 15 percent of sodium oxide. When the material was exchanged once with a solution containing either rare earth metal nitrates or rare earth metal chlorides, the sodium oxide content of the exchanged zeolites was reduced to about 3.7 to 4.5 percent based upon the weight of the zeolite. When the exchanged material was then reexchanged with rare earth nitrate, the sodium oxide content was reduced to about 3.5 percent. A further exchange with rare earth metal nitrates yielded a material of almost the same sodium oxide content. In the case of exchange with rare earth metal chlorides, the second and third exchanges reduced the sodium oxide content to about 3.6 percent and 3.2 percent respectively. In contrast to this, when the material which had been exchanged once to a sodium oxide content of 3.6 percent, was calcined at 1200° F. for 10 minutes and then exchanged (in accordance with the present invention), the second exchange drastically reduced the sodium oxide content to about 1.25 percent based upon the weight of the exchanged zeolite. Thus the calcination caused the second exchange to remove about 20 times the amount of sodium which would otherwise have been removed.

Figure 2:
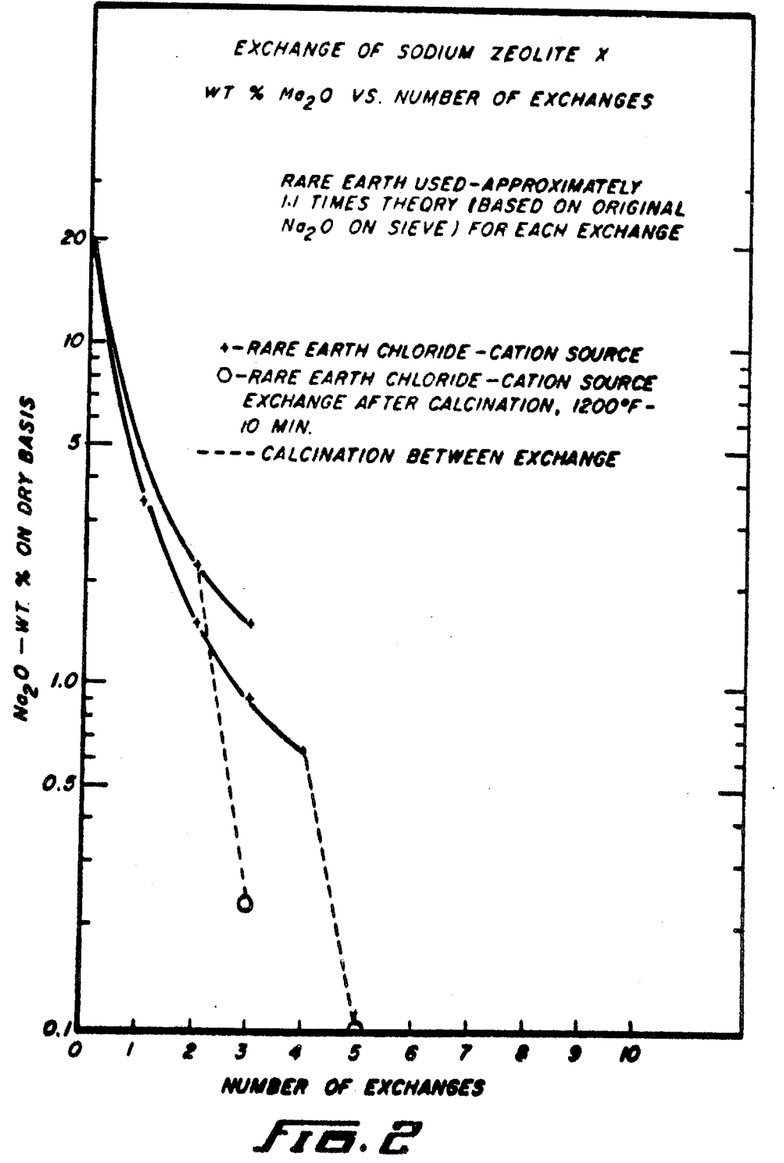
FIG. 2 shows the same relationship for zeolite X.

In the case of zeolite X, effective calcination after partial exchange was equally striking. In one run, using rare earth metal chlorides as the source of rare earth metal cations, two exchanges reduced the sodium oxide content from a level of about 20 weight percent to 2.4 weight percent. A third exchange reduced the sodium oxide content to 1.5 weight percent. When the twice exchanged material was calcined at 1200° F. for 10 minutes prior to the third exchange, the sodium oxide content was reduced to 0.23 percent. In another run, where four exchanges were conducted with rare earth metal chlorides to give a sodium oxide content of 0.64 percent, a fifth exchange without calcination reduced the sodium oxide content by a very small margin to 0.55 percent, whereas a fifth exchange subsequent to calcination treatment for 10 minutes at 1200° F., reduced the sodium oxide content to 0.1 percent.

The graphs thus demonstrate that calcination of a partially rare earth exchanged zeolite X or zeolite Y prior to further exchange results in a much more efficient use of the exchange solutions and a considerably greater reduction in the sodium content of the zeolite than would be the case without calcination.

The following examples are presented to further illustrate the present invention. Parts and percentages are on a weight basis unless otherwise stated.

EXAMPLE 1 (Comparative)

Rare Earth Nitrate Exchange Without Calcination 800 grams of wet Linde SK-30 synthetic crystalline aluminosilicate filter cake containing about 14.7% sodium as $Na_2O$ (a synthetic aluminosilicate characterized by the molecular formula of zeolite Y above) was slurried in 6500 milliliters of water. 550 grams of rare earth nitrate hexahydrate (40% of rare earth oxide) crystals (equivalent to approximately 1.1 times the theoretical amount to exchange all of the sodium on the aluminosilicate) was dissolved in the slurry.

After mixing for 30 minutes at 45° to 50° C. the slurry was filtered and washed with 12,000 milliliters of water containing 200 grams of rare earth nitrate.

Analysis showed 3.8% $Na_2O$ based on the dry weight of a filter cake.

The cake from the first exchange was reslurried in 6550 milliliters of water and 550 grams of rare earth nitrate added. After one hour at 40° to 50° C., the slurry was refiltered and washed with 12,000 milliliters of water containing 200 grams of rare earth nitrate.

Analysis of the cake showed 3.7% $Na_2O$ based on the dry weight of the cake.

The procedure was repeated again as above, except the slurry was agitated for two hours at 40° to 50° C. before filtering. No rare earth nitrate was added to the wash water.

Analysis showed $Na_2O$ to be 3.5% based on the dry weight of washed cake.

EXAMPLE 2 (Comparative)

Rare Earth Chloride Exchange Without Calcination

The same procedure and the synthetic zeolite employed in Example 1 were employed herein, except that 485 grams of rare earth chloride hexahydrate (45% as rare earth oxide on calcination) were added to the slurry instead of the nitrate of Example 1 and 175 grams of rare earth chloride (45% of rare earth oxide on calcination) was added to the wash solution.

The mixing time before filtering was 24 hours for the first exchange, 16 hours for the second and 3 hours for the third exchange.

$Na_2O$ analysis at the conclusion of each of three exchange procedures was 3.6%, 3.3% and 3.1% based on the dry weight of the washed cake.

EXAMPLE 3

Once Exchanged Zeolite Y Aluminosilicates, Calcined and then Exchanged Again

Synthetic aluminosilicate identified as Linde's Y sieve (SK-30), (as in Examples 1 and 2) was exchanged once employing the procedure of Example 2 above. The wet cake was charged to a hot (1200° F. shell temperature) rotary calciner.

Steam was bled into the back of the calciner. The bed temperature was raised to 1200° F. and held there for 10 minutes and then the batch discharged.

One kilo of the calcined partially exchanged sieve was slurried in 8730 milliliters of water. Rare earth chloride, equivalent to the theoretical amount of sodium originally on the aluminosilicate, was added. After 30 minutes at 40° to 55° C. the slurry was filtered and washed to the absence of chloride as determined by a silver nitrate test in the filtrate.

$Na_2O$ analysis showed 1.25% on a dry basis.

In order to demonstrate the significance of being able to rapidly and readily reduce the sodium content of synthetic zeolites which are to be employed as catalysts for the cracking of hydrocarbons, a comparison of the activity of catalysts prepared in Examples 1 and 3 with a standard commercially available 13% alumina silica-alumina catalyst fluid cracking catalyst was undertaken employing an established standard test procedure. The test procedure used is given in the American Cyanamid Company's "Test Method for Synthetic Fluid Cracking Catalyst", First Edition, Sections 7 and 9 with the following modifications: The amount of oil fed is decreased from 70 cc. to 30 cc. and the time on stream is decreased from one hour to fifteen minutes.

Briefly in the test procedure 30 cc. of gas oil are metered over a 15 minute period through a fixed bed of 50 cc. of steam deactivated catalyst. The catalyst is contained in a tube which is held at 940° ± 2° F. by means of a muffle furnace. The gas oil is down fed through a preheater section of the catalyst tube and through the catalyst bed. Product vapors are cooled and the resulting condensed liquid is collected in a receiver, while the non-condensed gases are sampled and metered with a Wet Test Meter.

The liquid product (cracked gas oil) is distilled using a 125 ml. Engler Flask. The distillate is collected up to the point where the vapors reach 400° F.

The gas sample is examined by mass spectrometry for its various components.

The results of this comparison are set forth in Table I below:

TABLE I

| Sample | Catalyst Pretreatment | Conv. | Activity | G.F.[c] | C.F.[d] | $C_5^+$[e] |
|---|---|---|---|---|---|---|
| 13% $Al_2O_3$-$SiO_2$ | 750° C.Steaming 17 Hours | 40 | 38 | .93 | 1.67 | 1.03 |
| Example 1[a] | 750° C.Steaming 17 hours | 57 | 58 | .64 | .44 | 1.18 |
| Example 3[b] | 750° C.Steaming 17 hours | 57 | 62 | .49 | 0.45 | 1.25 |

[a]aluminosilicates - prepared as in Example No. 1 and then blended with washed 13% $Al_2O_3$ $SiO_2$ cracking catalyst before being spray dried. Catalyst contained 5% rare earth Zeolite Y based upon the total catalyst weight.

[b]aluminosilicates - prepared as in Example No. 3 and then blended with washed 13% $Al_2O_3$-$SiO_2$ cracking catalyst before spray drying Catalyst contained 5% rare earth Zeolite Y based upon the total catalyst weight.

[c] "G.F." is the gas factor - the ratio of the volume of gas produced at standard conditions (dry gas, 20° C., 29.92 in./Hg.) by test catalyst to that produced by the standard catalyst at equal conversion.

[d] "C.F." is the carbon factor - the ratio of the carbon yield with the test catalyst to that obtained with standard catalyst at equal conversion.

[e] $C_5^+$ is the ratio of $C_5^+$ compounds (up to 400° F. n.b.p.-debutanized) yield with the test catalyst at equal conversion.

These terms are described in American Cyanamid Company's "Test Methods For Synthetic Fluid Cracking Catalyst", First Edition, page 58.

It will be seen from Table I above that catalysts containing crystalline aluminosilicate exchanged in accordance with this invention give a greater potential yield of gasoline as evident from the $C_5^+$ factor.

EXAMPLE 4 (Comparative)

Exchange of Sodium Aluminosilicate of the Zeolite Y Type After Calcination

Synthetic aluminosilicate identified as Linde's Y sieve (SK-30) containing 60% moisture (as received) was calcined as in Example 3 without exchanging prior to calcination.

Two kilos of the calcined sodium sieve was slurried in 38.5 liters of water. Rare earth nitrate was added equivalent to 1.1 times the theoretical amount of sodium on the aluminosilicate. After 60 minutes at 50°–55° C. the slurry was filtered and washed with 45.4 liters of warm water.

The above washed cake was exchanged a second time using the same amounts of water and rare earth nitrates.

Analysis of the washed cake showed 5.6% $Na_2O$ on a dry basis.

The above procedures demonstrate that calcination before cation exchanging is ineffective for sodium removal.

A sample of the above twice exchanged and washed aluminosilicate was blended to give 5% exchanged sieves (dry) with washed 13% alumina, silica-alumina hydrogel cracking catalyst spray dried as in the test in Example 3.

A.G.C. results are shown in Table II.

TABLE II

| Sample | Catalyst Pretreatment | Conv. | Activity | G.F. | C.F. | $C_5$ |
|---|---|---|---|---|---|---|
| Example | 750° C.Steaming 17 hours | 38 | 37 | .98 | 1.07 | 1.0 |

It will be seen from Tables I and II above that catalysts containing aluminosilicate that was calcined before being exchanged gives no advantage over a standard 13% alumina, silica-alumina catalyst.

EXAMPLE 5

Ammonium Exchange of Rare Earth Y Sieve

Linde's sodium Y sieve (SK-30) was rare earth exchanged and calcined as in Example No. 3.

204 grams of calcined sieves were slurried with 106 grams of $NH_4Cl$ in 3,500 ml. of hot water. After 40 minutes of agitation at 50°–65° C. the slurry was filtered and washed to no chloride in the filtrate.

Analysis showed 19.4% $RE_2O_3$, 1.35% $Na_2O$ and 1.9% $NH_3$ all on a dry basis.

EXAMPLE 6

Ammonium Exchange of Rare Earth Y Sieves by $NH_4Cl$ Wash

Linde's sodium Y sieves (SK-30) were rare earth exchanged and calcined as in Example No. 3.

Ten pounds of the calcined partially exchanged sieves were slurried in 90 pounds of 140° F. water. 7.2 pounds of rare earth chloride hydrate were added to the slurry. After 45 minutes of agitation the slurry was filtered and washed with 12 pounds of water. The cake was dewatered and then washed with 58 pounds of 3% ammonium chloride solution. The cake was given a final wash with 330 pounds of water.

Analysis showed 21.0% $RE_2O_3$, 0.8% $Na_2O$, and 2.1% $NH_3$ all on a dry basis.

Examples 5 and 6 demonstrate that the sodium content can be reduced effectively in the exchange after calcining, using ammonium salts alone, or in combination with rare earth salts.

EXAMPLE 7 (Comparative)

Rare Earth Chloride Exchange on Aluminosilicate of the Zeolite X Type 80 pounds of a Linde 13X aluminosilicate sieve (a Zeolite X Type sieve) wet cake was slurried in 860 pounds of water and 68 pounds of rare earth chlorides (1.1 equivalents to the theoretical amount of sodium originally present were added to the slurry.) After 1 hour at 125° to 130° F. the slurry was filtered and washed.

The washed cake was re-exchanged as above for a total of four exchanges (the $Na_2O$ analysis were 3.4, 1.5, 0.9 and 0.6, all on the dry basis for the filter cake for the exchange steps respectively.)

EXAMPLE 8

Re-exchange of Partially Exchanged Rare Earth Zeolite X Type Sieve After Calcination A sample of the fourth exchanged cake from Example 7 was dried at 250° F. for 24 hours and then calcined by charging to a cold rotary kiln and then heated at 1200° F. Steam was bled into the kiln during calcination. After 10 minutes at 1200° F. the batch was discharged.

88 grams of the calcined aluminosilicate was slurried in 850 milliliters of water and 71 grams of rare earth chloride (approximately 1.1 theory based on the original sodium content of the original aluminosilicate) was added. After mixing for 30 minutes at 45° to 50° C. the slurry was filtered and washed to the absence of chloride.

Analysis showed 0.10% of sodium oxide on a dry basis.

EXAMPLE 9

The Calcination and Re-Exchange of Partially Exchanged Rare Earth Zeolite X 332 grams of a Zeolite X sieve identified as Linde 13X filter cake was slurried in 3000 milliliters of water. 283 grams of rare earth chloride (1.1 theory) was added. After 30 minutes at 45° to 50° C., the slurry was filtered and washed with 5000 milliliters of water.

The cake was re-exchanged using the same procedure and amounts of waer and rare earth chlorides as in the first exchange. The slurry was filtered and washed to the absence of chloride in the filtrate.

Analysis showed 2.5% of sodium oxide on the dry basis of the original filter cake.

Approximately ¼ of the amount of the above filter cake was given a third exchange, using one-fourth of the amount of water and rare earth chlorides.

Analysis of the washed cake showed 1.5% $Na_2O$ on a dry basis of the original filter cake.

The remaining sample from the second exchange was dried for 1 hour at 180° C. and then calcined for 10 minutes at 1100°–1150° F. with no steam atmosphere. 88 grams of the calcined aluminosilicate was exchanged using 850 milliliters of water and 71 grams of rare earth chloride. After 30 minutes at 45° to 55° C., the slurry was filtered and washed to the absence of chloride in the filtrate.

Analysis showed 0.23% sodium oxide based on the dry weight of the original filter cake.

EXAMPLE 10

This example illustrates the preparation of a zeolite Y silica-alumina composite catalyst using the sieve.

500 lbs. of water, 120 lbs. of Phila N-brand-silicate, 5.8 lbs. of sieve from Example 6 blended with 70 lbs. of water, were charged into a tank. 80 lbs. of 25% sulfuric acid were added slowly to a pH of 5 with sufficient agitation to assure uniform blending of the acid and to keep the gel well dispersed as it was being formed. 100 lbs. of water were added to dilute the gel before addition of 55 lbs. of an alum solution (containing 21.5 lbs. of alum) and 15.6 lbs. of a sodium aluminate solution (having 5.7 lbs. of bauxite ore concentrate and 4.9 lbs. of sodium hydroxide and the balance water). The two solutions were added in sequence such that the pH of the mix remained above 3.8. The resultant mixture was dewatered on a filter and the filter cake washed first with water and then aqueous ammonia to remove sodium and sulfate ions. The washed filter cake was diluted with water and spray dried.

EXAMPLE 11 (Comparative)

Following the procedure of Example 3, synthetic aluminosilicate of the zeolite Y type was exchanged with rare earth metal cations in a first exchange. The zeolite after drying and calcination but without a subsequent exchange was then subjected to chemical analysis and unit cell parameter determinations. Results are given in Table III below.

EXAMPLE 12

The procedure of Example 3 was again followed. In this example a second exchange following drying and calcination after the first exchange was carried out using rare earth metal cations in each exchange. The zeolite after the second exchange was then subjected to chemical analysis and unit cell parameter determinations.

Again following the procedure of Example 3 in every material detail the twice exchanged and washed aluminosilicate was blended with a cracking catalyst material. However, in this example the catalyst material was obtained by blending clay with a 13% alumina, silica-alumina catalyst so as to provide 50% by weight of clay based on the total weight of the catalyst material. The aluminosilicate was blended so as to provide a composite containing 10% by weight of the total composite on a dry basis of aluminosilicate. The composite was washed and spray dried as in Example 3. The resulting composite was then dried and calcined at 1100° F. for about an hour. Samples of the composite thus obtained were then subjected to steaming at 1300° F. and 1500° F. for 5 hours and tested in the standard test described in Example 3. Performance of the composite treated as described above is also given in Table III, wherein the results reported are the averages of duplicate runs in each case.

X-ray diffraction patterns of the exchanged zeolite prior to blending are given in Table III.

EXAMPLE 13 (Comparative)

The procedure of Example 11 was followed in every material detail except that in the exchange an aqueous solution of ammonium chloride containing sufficient ammonium ions to provide an excess of 100% above the stoichiometric amount of sodium ions present was employed. Results of chemical analysis and unit cell parameter determinations are given in Table III.

EXAMPLE 14 (Comparative)

The procedure of Example 12 was followed except that in the first exchange of the zeolite Y type aluminosilicate ammonium cations were used in exchange, as in comparative Example 13. After the first exchange, the aluminosilicate was dried and calcined and subjected to a second exchange with rare earth metal cations as in Example 3. Using the aluminosilicate thus obtained, a composite was prepared as in Example 12. Testing was as in Example 12 and results are given in Table III.

X-ray diffraction patterns of the exchanged zeolite prior to blending are given in Table IV.

The results given in Table III show the increased content in rare earth metal cations of a catalyst of the present invention compared to prior art materials. The improved conversions after steaming at 1300° F. and 1500° F. of a catalyst of the present invention is readily apparent. The unit cell parameters are not significantly changed from those of the original sodium zeolite by the process of the present invention whereas a significant change, i.e. greater than 0.03 occurs in prior processes where other than rare earth cations are used in an exchange prior to calcination. The X-ray diffraction patterns show a distinction in composition of a catalyst of the present invention from that of the prior art.

TABLE III

| Catalyst Material From Example | Loss On Ignition (%) | Rare Earth Oxide, $R_2O_3$ (%) | $Al_2O_3$ (%) | $Na_2O$ (%) | Conversion (%) After Steaming 5 Hrs. At | | Unit Cell Parameters, $a_o$ |
|---|---|---|---|---|---|---|---|
| | | | | | 1300° F. | 1500° F. | |
| 11 (Comparative) | 6.1 | 15.7 | 19.0 | 3.5 | — | — | 24.69 |
| 12 | 8.7 | 20.4 | 17.6 | 0.81 | 80.42 | 72.13 | 24.72 |
| 13 (Comparative) | 11.5 | 0 | 22.3 | 2.1 | — | — | 24.55 |
| 14 (Comparative) | 9.4 | 5.4 | 20.8 | 0.55 | 77.65 | 63.19 | 24.60 |
| Starting Zeolite | — | — | — | — | — | — | 24.70 |

TABLE IV

X-RAY DIFFRACTION PATTERNS

| | Catalyst of Example 14 | | | Catalyst of Example 12 | | |
|---|---|---|---|---|---|---|
| $h^2+k^2+l^2$ | d in A° | Relative Intensity | Total Counts Per Sec. | d in A° | Relative Intensity | Total Counts Per Sec. |
| 3 | 14.17 | 100 | 934 | 14.22 | 100 | 604 |
| 8 | 8.69 | 20 | | | | |
| 11 | 7.41 | 16 | | 7.43 | 2 | |
| 12 | 7.12 | 1 | | 7.12 | 5 | |
| 19 | 5.65 | 42 | | 5.67 | 6 | |
| 27 | 4.73 | 18 | | 4.75 | 5 | |
| 32 | 4.35 | 14 | | 4.36 | 4 | |
| 35 | | | | 4.16 | 1 | |
| 36 | 4.10 | 1 | | 4.11 | 4 | |
| 40 | 3.892 | 5 | | | | |
| 43 | 3.752 | 29 | | 3.763 | 18 | |
| 48 | 3.550 | 1 | | 3.563 | 1 | |
| 51 | 3.444 | 4 | | 3.457 | 2 | |
| 56 | 3.288 | 17 | | 3.300 | 6 | |
| 59 | 3.204 | 2 | | 3.214 | 2 | |
| | | | | 3.087 | 1 | |
| 67 | 3.004 | 4 | | 3.015 | 1 | |
| 72 | 2.900 | 6 | | 2.911 | 5 | |

TABLE IV-continued

X-RAY DIFFRACTION PATTERNS

| $h^2+k^2+l^2$ | Catalyst of Example 14 | | | Catalyst of Example 12 | | |
|---|---|---|---|---|---|---|
| | d in A° | Relative Intensity | Total Counts Per Sec. | d in A° | Relative Intensity | Total Counts Per Sec. |
| 75 | 2.840 | 13 | | 2.851 | 4 | |
| 80 | 2.751 | 5 | | 2.761 | 3 | |
| 83 | 2.701 | 2 | | 2.710 | 3 | |
| 88 | 2.621 | 7 | | 2.632 | 3 | |
| 91 | 2.579 | 2 | | 2.590 | 3 | |
| 96 | 2.513 | 1 | | 2.520 | 1 | |
| 211 | 1.693 | 2 | | | | |
| 243 | 1.578 | 2 | | 1.586 | 2 | |

I claim:

1. A process for producing rare earth exchange zeolite Y of improved activity and stability which comprises treating an aqueous solution of rare earth metal salt wherein the cations consist essentially of rare earth metal cations so as to obtain a partial exchange of alkali metal cations by rare earth metal cations such that the alkali metal content of zeolite Y is in the range of 3 to 4%, said percentage based on the dry weight of zeolite; calcining the resultant partially exchanged zeolite by heating the same to a temperature above about 450° C. to provide a dehydrated zeolite characterized by the same spatial relationship and unit cell size as the zeolite prior to calcination and treating the resultant calcined partially exchanged zeolite with a second aqueous solution containing rare earth metal cations to reduce further the alkali metal content of said zeolite.

2. The process of claim 1 wherein a rare earth exchanged zeolite Y having a rare earth metal oxide content of about 18.5% by weight on a dry basis is obtained.

* * * * *